Dec. 30, 1958     A. J. BLUNDELL     2,866,928

ELECTRIC RECTIFIERS EMPLOYING SEMI-CONDUCTORS

Filed May 21, 1956

INVENTOR
ALAN JOHN BLUNDELL

BY

HIS ATTORNEY

United States Patent Office

2,866,928
Patented Dec. 30, 1958

2,866,928

ELECTRIC RECTIFIERS EMPLOYING SEMI-CONDUCTORS

Alan John Blundell, Willoughby, near Rugby, England, assignor to The British Thomson-Houston Company Limited, London, England, a British company Application May 21, 1956, Serial No. 586,243

Claims priority, application Great Britain May 23, 1955

4 Claims. (Cl. 317—234)

This invention relates to electric rectifiers employing semi-conductors as the rectifying element, the contact with the rectifying element being of the broad area P-N junction type.

In constructing electric rectifiers of the above type, it is essential, inter alia, to provide the rectifying element with an hermetically sealed casing to obviate the deleterious effects of atmospheric conditions on the rectifying element, and to ensure that an undue rise in temperature of the rectifying element does not occur either during manufacture or operation, and to reduce to a minimum the number of sealing points required in constructing the enclosing envelope for the element.

It is the object of the invention to provide a construction of electric rectifier which will satisfy these desiderata.

A P-N junction rectifier of the kind set forth, according to the invention, comprises a base of a metal of good thermal conductivity, to which the rectifying element is intimately secured at one face, a co-operating electrode extending from the other face of the element and terminating in a metal rod, a flanged metal annulus hermetically secured at its flange to the base, so as to encircle the element, an annular insulating member which forms on the one hand, an hermetic joint to the metal annulus and, on the other hand, an hermetic joint to the rim of a blind metal sleeve provided with a central recess into which extends the metal rod terminating the co-operating electrode, the rod being held within the recess in, and electrical contact made to, the metal sleeve by pressing the wall of the recess on to the rod.

The enclosure for the rectifying element is thus constituted by the inner faces, or walls, of the base, the flanged metal annulus, the annular insulating member and the metal sleeve, all of which are intimately secured to adjacent members to form an hermetically sealed casing.

The invention will be better understood from a consideration of the following description of the accompanying drawings, in which—

Figure 1:
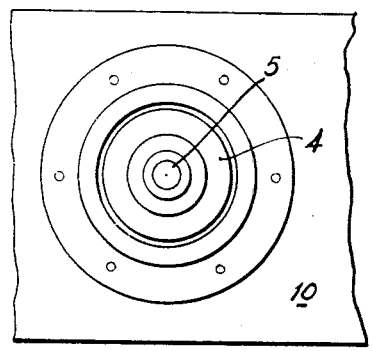
Fig. 1 is a plan view of a rectifier constructed in accordance with the invention.
Figure 2:
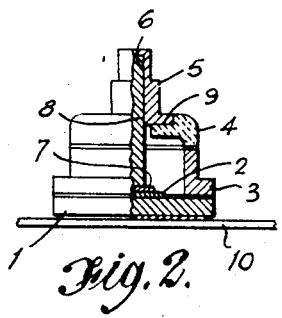
Fig. 2 is an elevation partly in section, to show the internal construction of the rectifier.
Figure 3:
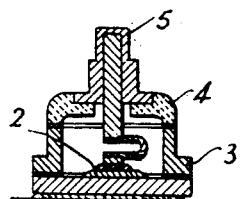
Fig. 3 is a view similar to Fig. 2 of a modified construction.

Referring to Figs. 1 and 2, there is shown the rectifier as consisting of a base plate or member 1 of metal of high thermal and electrical conductivity, e. g. copper, to which the rectifying element 2 is attached. The base member 1 has secured to it a flanged metal annulus 3, to the upper rim of which is hermetically secured an insulating member 4. The member 4 is shown as formed with an internal shoulder into which seats the flanged portions of a metal sleeve 5 provided with a blind hole or recess 6. The base member 1, metal annulus 2, insulating member 3 and metal sleeve 5, together form an hermetic enclosure for the rectifying element 2. The rectifying junction or element 2 is formed of a pellet 7 of impurity element of appropriate conductivity type, which pellet is connected with an electrode or lead 8 which terminates in a recess 6 in the sleeve 5.

The insulating member 4 may be of glass or ceramic material. When formed of ceramic material, as is preferable, it is provided with a shoulder 9 on to which the rim of the metal sleeve 5 fits, the rim of the metal sleeve being secured to the ceramic member by means of a solder which unites with the rim of the metal sleeve and with a metallic film, previously provided on the surface of the shoulder on the ceramic member. The ceramic member is then similarly united to the metal annulus 3. When glass is employed in place of ceramic material, the glass is hermetically sealed by fusion to the metal annulus 3 and to the metal sleeve 5, the glass and metal being chosen to have a thermal expansion characteristic comparable with that of the metal members to which it is secured, and the metals being selected to form an hermetic joint with the glass.

The rectifying element 2 may be secured to the metal base by means of a low melting point solder, the co-operating electrode 8 being secured to the remote face of the rectifying element in such a way as to form thereat a rectifying junction. The procedure for forming such junctions is now well-known and when germanium of N-type conductivity is used for the rectifying element 2, the co-operating conductor may be secured to the face of the germanium element with an interposed layer of indium which forms the pellet 7.

The final steps in manufacturing such a rectifier are (a) to bring together the two parts, the one consisting of the base plate 1 with its attached rectifying element 2 and co-operating electrode 8, and the other consisting of the metal annulus 3 with the metal sleeve secured thereto 5, through the intermediary of the annular insulating member 4; (b) to secure the flange on the metal annulus 3 to the base plate; (c) to secure the metal rod 8 extending from and forming part of the co-operating electrode, in the recess 6 in the metal sleeve 5, thus making electrical contact and securely holding it in position and preventing subsequent disturbance of the co-operating electrode at its junction with the rectifying element.

The securing of the flange of the metal annulus to the base plate may be effected by a pressure process using a layer of indium between the adjacent faces of the base plate and the flanged metal annulus. This method forms no part of the present invention but is described and claimed in co-pending application, Serial No. 586,090, by Alan John Blundell and Harry Roy Noon, and assigned to the assignee of the present application.

In the securing of the metal rod 8 into the recess in the metal sleeve 5, the wall of the sleeve is preferably crimped or pressed on to the rod. To make it possible to press the wall of the metal sleeve 5 on to the rod 8, a portion of the wall of the recess in the metal sleeve may be made of reduced cross section, so as to render it readily deformable. The rod may be a hollow tube so that deformation is sufficient to give a large electrical contact area.

In order to ensure that during the pressing of the wall of the metal sleeve on to the rod, no undue stress is imposed on the joint between the co-operating electrode and the rectifying element, we prefer to form the co-operating electrode of resilient material such as a braided conductor, as shown in Fig. 2, or a flexible loop of wire or strip conductor, the conductor, wire or strip being secured to the metal rod so as to permit of slight relative movement between them during the final assembly operation.

Figure 4:
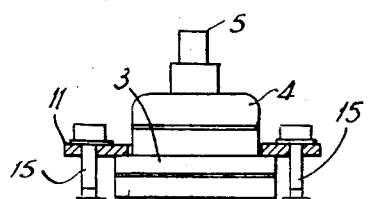
Figs. 4 to 6 show three ways of mounting the rectifier in a heat-radiating fin.
Figure 5:
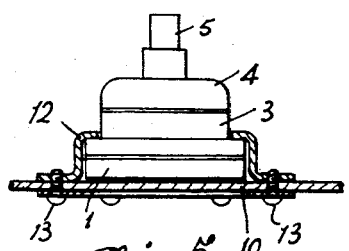
Figure 6:
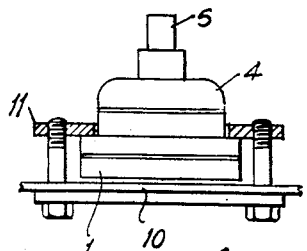

During operation, it is desirable to ensure that the heat developed by the passage of rectified current through the rectifier element does not cause undue heating of the element, and the metal base 1 is accordingly made of a metal of good thermal conductivity, e. g. copper, and is of sufficient thickness to remove by conduction, the heat developed at the rectifying element. To ensure that the heat so removed is dissipated, there may be provided in intimate contact with the metal base, a radiating fin 10 of large surface area, secured in intimate contact with the metal base. The radiating fin may be secured to the metal base either by a low melting point solder, or alternatively, as shown in Figs. 4 to 6, the fin may be clamped to the metal base, using the external shoulder on the flanged metal annulus as a seat on which a clamping washer 11 (Figs. 4 and 6) or ring 12 (Fig. 5) can be located. The washer or ring may be secured to the fin by rivets as shown in Fig. 5, or by bolts or the like, as shown in Figs. 4 and 6. Thus, for example, the fin may be provided with a number of spaced cleat nuts 14 (Fig. 4) secured to it, the nuts being engaged by screws 15, the shanks of which pass through the annular clamping washer 11 which engages the face of the flanged metal annulus 3.

What I claim is:

1. A P-N junction rectifier comprising a base member constituted of a metal of high electrical conductivity, a piece of semi-conducting material secured at one face in intimate contact with a face of said base member, an electrode electrically connected with the other face of said piece and forming therewith a rectifying junction, a metal rod terminating said electrode, a flanged metal annulus surrounding said piece and hermetically secured at its flange to the face of said base member to which said piece is secured, an annular ceramic member having one face secured hermetically to the rim of said metal annulus, said ceramic member being formed with a recess on an outer side thereof with a shoulder therearound, a blind metal sleeve having a flange located in said recess in said ceramic member and hermetically secured therein, said metal sleeve having a central recess into which said metal rod extends and within which it is frictionally secured, whereby said metal sleeve forms one terminal of said rectifier and said main base member forms the other terminal of said rectifier.

2. A P-N junction rectifier comprising a base member constituted of a metal of high electrical conductivity, a piece of semi-conducting material secured at one face in intimate contact with a face of said base member, an electrode electrically connected with the other face of said piece and forming therewith a rectifying junction, a flexible conductor secured to said electrode at one end thereof, a metal rod secured to the other end of said flexible conductor, a flanged metal annulus surrounding said piece and hermetically secured at its flange to the face of said base member to which said piece is secured, an annular ceramic member having one face secured hermetically to the rim of said metal annulus, said ceramic member being formed with a shoulder, a blind metal sleeve having a flange located in said shoulder in said ceramic member and hermetically secured therein, said metal sleeve having a central recess into which said metal rod extends and within which it is frictionally secured, whereby said metal sleeve forms one terminal of said rectifier and said main base member forms the other terminal of said rectifier.

3. A P-N junction rectifier comprising a base member constituted of copper, a flake of monocrystalline germanium secured at one face in intimate contact with a face of said base member, said flake containing an impurity element of one conductivity type, a conductor, one end of said conductor being secured to the exposed face of said flake by means of a solder of a low melting point impurity element of opposite conductivity type diffused into said flake so as to form therewith a rectifying junction, said conductor terminating in a metal rod, a flanged metal annulus surrounding said piece and hermetically secured at its flange to the face of said base member to which said piece is secured, an annular ceramic member having one face secured hermetically to the rim of said metal annulus, said ceramic member being formed with a shoulder, a blind metal sleeve having a flange located in said shoulder in said ceramic member and hermetically secured therein, said metal sleeve having a central recess into which said metal rod extends and within which it is frictionally secured, whereby said metal sleeve forms one terminal of said rectifier and said main base member forms the other terminal of said rectifier.

4. A P-N junction rectifier comprising a base member consisting of a metal of high electrical conductivity, a flake of monocrystalline semi-conductor material secured by means of a low melting point solder to one face of said base member, said flake containing an impurity element of one conductivity type, a flexible conductor, one end of said conductor being secured to the exposed face of said flake by means of a pellet of an impurity element of opposite conductivity type diffused into said flake so as to form therewith a rectifying junction, the other end of said conductor being connected to one end of a metal rod, a flanged metal annulus surrounding said flake and hermetically secured at its flange to the face of said base member to which said flake is secured, an annular ceramic insulator having one face secured hermetically to the rim of said metal annulus, said insulator being formed with a shoulder, a blind flanged metal sleeve seated against said shoulder and hermetically secured therein by solder, said sleeve having an internal recess into which the other end of said metal rod extends, said sleeve being crimped to frictionally secure said rod within the sleeve, said sleeve and said base member forming the terminals of said rectifier.

References Cited in the file of this patent

UNITED STATES PATENTS

| 794,459 | Hogg | July 11, 1905 |
| 2,603,692 | Scaff et al. | July 15, 1952 |
| 2,740,940 | Becker et al. | Apr. 3, 1956 |
| 2,790,940 | Prince | Apr. 30, 1957 |

FOREIGN PATENTS

| 714,976 | Great Britain | Sept. 8, 1954 |
| 1,119,805 | France | Apr. 9, 1956 |